United States Patent
Purohit

(10) Patent No.: US 9,716,984 B2
(45) Date of Patent: Jul. 25, 2017

(54) MULTICAST PACKET DELIVERY IN A WIRELESS NETWORK OPERATING IN NON-STORING MODE

(71) Applicant: GainSpan Corporation, San Jose, CA (US)

(72) Inventor: Sibasis Purohit, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 129 days.

(21) Appl. No.: 14/602,278

(22) Filed: Jan. 22, 2015

(65) Prior Publication Data

US 2016/0219414 A1   Jul. 28, 2016

(51) Int. Cl.
| | | |
|---|---|---|
| H04L 12/28 | (2006.01) | |
| H04W 4/06 | (2009.01) | |
| H04L 12/741 | (2013.01) | |
| H04L 12/761 | (2013.01) | |
| H04L 12/18 | (2006.01) | |

(52) U.S. Cl.
CPC ............... *H04W 4/06* (2013.01); *H04L 45/16* (2013.01); *H04L 45/54* (2013.01); *H04L 45/74* (2013.01); *H04L 12/189* (2013.01)

(58) Field of Classification Search
USPC ........... 370/312, 349, 389, 390, 392, 395.31
See application file for complete search history.

(56) References Cited

U.S. PATENT DOCUMENTS

| | | |
|---|---|---|
| 7,313,596 B2 | 12/2007 | Tani et al. |
| 7,710,986 B2 | 5/2010 | Zeng et al. |
| 7,961,646 B2 | 6/2011 | Liu et al. |
| 8,289,883 B2 | 10/2012 | Zhu et al. |
| 2004/0158872 A1* | 8/2004 | Kobayashi .......... H04L 12/1886 725/120 |

(Continued)

OTHER PUBLICATIONS

Oikonomou G, Phillips I, Stateless Multicast Forwarding with RPL in 6LowPAN Sensor Networks, "http://www.spd.gr/Files/Oikonomou-2012-1-persens.pdf", Pervasive Computing and Communications Workshops (PERCOM Workshops), 2012 IEEE International Conference on, Date of Conference: Mar. 19-23, 2012 , pp. 272-277, Publisher:IEEE.

(Continued)

*Primary Examiner* — Kwang B Yao
*Assistant Examiner* — Nguyen Ngo
(74) *Attorney, Agent, or Firm* — Pearl Cohen Zedek Latzer Baratz LLP

(57) ABSTRACT

A router node according to an aspect of the present disclosure maintains multicast information indicating child nodes registered for respective multicasts, while operating in a non-storing mode along with other router nodes of a wireless network for processing unicast packets. Upon receiving a layer-3 multicast packet, the router node examines the multicast information to identify a set of child nodes registered for the corresponding multicast. The router node thereafter unicasts, at L2-level, the layer-3 multicast packet to each child node of the set of child nodes. In an embodiment, the router node participates in a routing protocol (e.g., RPL) to form a hierarchy of nodes constituting the wireless network, with the hierarchy containing a root node and a set of end devices as leaf nodes.

9 Claims, 5 Drawing Sheets

(56) References Cited

U.S. PATENT DOCUMENTS

| | | | |
|---|---|---|---|
| 2006/0007930 A1* | 1/2006 | Dorenbosch | H04L 12/1886 370/390 |
| 2007/0189290 A1 | 8/2007 | Bauer | |
| 2008/0175239 A1* | 7/2008 | Sistanizadeh | H04L 12/18 370/390 |
| 2010/0061269 A1* | 3/2010 | Banerjee | H04L 12/4675 370/254 |
| 2012/0113986 A1* | 5/2012 | Shaffer | H04L 1/1854 370/390 |
| 2012/0155463 A1* | 6/2012 | Vasseur | H04L 67/145 370/390 |
| 2013/0121335 A1* | 5/2013 | Hui | H04L 12/18 370/390 |
| 2013/0294451 A1* | 11/2013 | Li | H04L 45/66 370/392 |
| 2014/0126575 A1 | 5/2014 | Janneteau et al. | |
| 2015/0200810 A1* | 7/2015 | Vasseur | H04L 12/1895 370/256 |
| 2016/0149856 A1* | 5/2016 | Hui | H04L 61/2015 370/252 |

OTHER PUBLICATIONS

Multicast forwarding, http://technet.microsoft.com/en-in/library/cc757858(v=ws.10).aspx , downloaded circa Nov. 26, 2014, pp. 1-2.
Configuring Multicast Forwarding, http://www.cisco.com/c/en/us/td/docs/server_nw_virtual/2-10-0_release/configuration/guide/swcg210/3multi.html , downloaded circa Nov. 26, 2014, pp. 1-3.
JP Vasseur, Navneet Agarwal, Jonathan Hui, Zach Shelby, Paul Bertrand, Cedric Chauvenet, RPL: The IP routing protocol designed for low power and lossy networks, Internet Protocol for Smart Objects (IPSO) Alliance, date Apr. 2011, pp. 1-20.
Wei Gan, Zhiqiang Shi ; Chen Zhang ; Limin Sun ; Ionescu D, Merpl: Abstract, A more memory-efficient storing mode in RPL , Networks (ICON), 2013 19th IEEE International Conference on , Date of Conference: Dec. 11-13, 2013 , pp. 1-5, Publisher:IEEE .

* cited by examiner

| Column 1 | Column 2 | Column 3 | Column 4 |
|---|---|---|---|
| Neighbor | MAC Address | IP Address | Parent/Child |
| 110 | MAC-110 | IP-110 | Parent |
| 150 | MAC-150 | IP-150 | Child |
| 160 | MAC-160 | IP-160 | Child |

(Row 2 indicator points to the 150 row; table labeled 300)

*FIG. 3*

MULTICAST PACKET DELIVERY IN A WIRELESS NETWORK OPERATING IN NON-STORING MODE

BACKGROUND

Technical Field

Embodiments of the present disclosure relate generally to wireless networks, and more specifically to multicast packet delivery in a wireless network operating in non-storing mode.

Related Art

A wireless network generally includes two or more wireless devices capable of communicating with each other on a wireless medium. Multicasting is one mode of communication in which each packet is specified to be destined to only a subset of the wireless devices in a corresponding wireless network. A multicast address (placed in a destination address field of each packet) typically determines the corresponding subset of wireless devices.

A wireless network may operate in non-storing mode. Non-storing mode refers to a mode of operation of a wireless network in which only a root node (also termed border router) of the wireless network has complete routing information. Routing information specifies the path in which each wireless device may be reached. Thus, when one wireless device is to send a packet to another wireless device, the one wireless device may rely on the root node for the routing information. An example implementation of such non-storing mode is described in RFC 6550 entitled, "RPL: IPv6 Routing Protocol for Low-Power and Lossy Networks".

Aspects of the present disclosure are directed to delivery of multicast packet to the corresponding destination wireless devices in a wireless network operating in non-storing mode.

BRIEF DESCRIPTION OF THE VIEWS OF DRAWINGS

Example embodiments of the present invention will be described with reference to the accompanying drawings briefly described below.

FIG. 3 is a diagram showing the contents of a neighbor table maintained in a node of a wireless network, in an embodiment of the present disclosure.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A router node according to an aspect of the present disclosure maintains multicast information indicating child nodes registered for respective multicasts, while operating in a non-storing mode along with other router nodes of a wireless network for processing unicast packets. Upon receiving a layer-3 multicast packet, the router node examines the multicast information to identify a set of child nodes registered for the corresponding multicast. The router node thereafter unicasts, at L2-level, the layer-3 multicast packet to each child node of the set of child nodes.

In an embodiment, the router node participates in a routing protocol (e.g., RPL) to form a hierarchy of nodes constituting the wireless network, with the hierarchy containing a root node and a set of end devices as leaf nodes. The child nodes are determined according to such a hierarchy.

According to another aspect, a registration request originates at (is created by) a first child node in the form of an IP (Internet Protocol) packet. The IP packet indicates that the root node is a (IP) destination for the IP packet, while the IP packet is encapsulated in a layer-2 header specifying the next router node as the destination. Each router node registers the corresponding child for the multicast specified in the body of the registration request, and also forwards the registration request to the parent in the hierarchy until the registration request reaches the root node.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
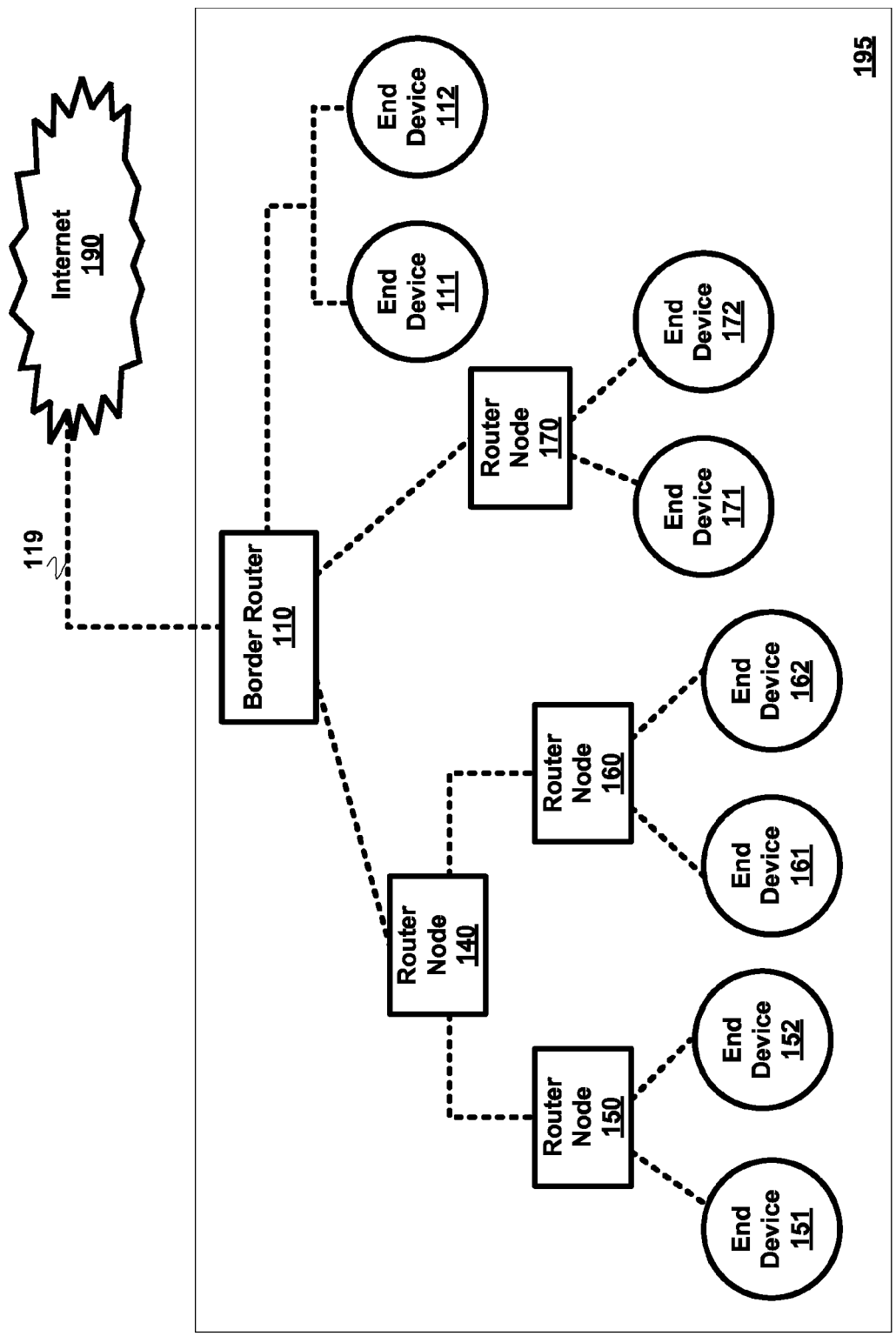
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing border router (root) 110, routers 140, 150, 160 and 170, end devices 111, 112, 151, 152, 161, 162, 171 and 172, and internet 190.

Each of the devices/nodes of FIG. 1 shown contained in wireless network (mesh) 195 represents a wireless device. As may be observed, the wireless devices are shown organized hierarchically based on operation of protocols such as RPL, and each dotted line of FIG. 1 thus represents a direct wireless path between two adjacent devices in the formed hierarchy. The corresponding pair of wireless devices (connected by a dotted line) are within communication range of each other, and are thus neighbors. Thus, for example, end devices 171 and 172 are the neighbors of router 170, routers 150 and 160 are neighbors of router 140, etc.

Internet 190 extends the connectivity of devices in mesh network 195 to various systems (not shown) connected to, or part of, internet 190. Internet 190 is shown connected to border router 110 through a wireless path 119. Internet 190 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

In an embodiment, each wireless device (also termed node) of mesh 195 is a wireless station (STA) according to IEEE 802.11 (family of) standards, though alternative embodiments can be implemented using standards such as IEEE 802.15.4, as would be apparent to one skilled in the relevant arts by reading the disclosure herein. An operator/user may configure/designate which one(s) of the STAs are to operate as a border router (110 in FIG. 1), routers (140, 150, 160 and 170), and end devices (111, 112, 151, 152, 161, 162, 171 and 172). In some embodiments, a router may additionally operate as an end device also. In an embodiment, mesh 195 may be formed according to RFC 6550 entitled, "RPL protocol (IPv6 Routing Protocol for Low-Power and Lossy Networks)", by the Internet Engineering Task Force (IETF). In alternative embodiments, however, mesh 195 may be formed using other approaches.

Wireless mesh network 195 is assumed to be configured and operable in the non-storing mode with respect to forwarding of unicast packets. Hence, only border router 110 may have complete routing information to enable delivery of unicast packets. Thus, in a prior approach, the other nodes (router nodes and end devices of FIG. 1) rely on border router 110 for delivery of a unicast packet to the destination node(s). In particular, each of the non-root nodes would keep record of its parent, and forward the packet to the parent until the root (border router 110) receives the packet. Border router 110 may then provide the routing information, and cause forwarding of the packet to the appropriate destination, for example, based on source routing described below.

For example, if end device 151 is to transmit a unicast packet to end device 161 as destination, end device 151 sends the packet first to its parent, namely router node 150. Router node 150, in turn forwards the packet to router node 140, which in turn forwards the packet to border router 110. Border router 110 then inserts the complete path (router 140-router 160-end device 161) in the packet header, and the unicast packet is delivered to end device 161 via router node 140 and router node 160. Such routing is termed source routing.

Thus, non-storing mode may be suitable (for forwarding unicast packets) in environments where nodes have limited memory. Aspects of the present disclosure relate to delivery of multicast packets in a wireless network operating in non-storing mode (for delivery of unicast packets), as described below with examples.

3. Forwarding of a Multicast Packet

Figure 2:
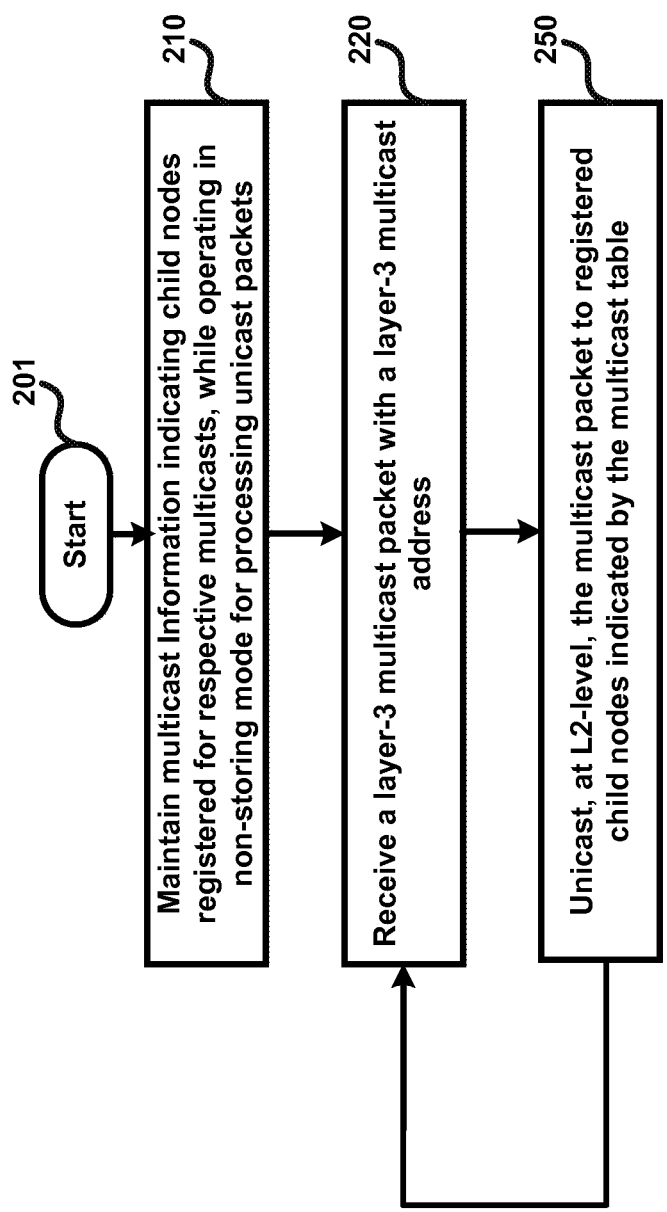
FIG. 2 is a flow chart illustrating the manner in which a router node of a wireless network forwards a received multicast packet, in an embodiment of the present disclosure.

FIG. 2 is a flow chart illustrating the manner in which a router node of a wireless network supports multicasting, in an embodiment of the present disclosure. Merely for illustration, the flowchart is described below as being performed in router node 140. However, the features can be implemented in the other routers of FIG. 1 also, as well as in other environments without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, router node 140 maintains multicast information indicating child nodes registered for respective multicasts, while operating in non-storing mode for unicast packets. A child node is a neighbor node, which is immediately lower in the hierarchy. As noted above, non-storing mode implies that, with respect to forwarding of unicast packets, router node 140 would merely need to communicate with parent node, and the routing information is eventually supplied by border router 110. As a result, memory requirements are reduced in each of the router nodes.

On the other hand, in relation to processing of multicasts, router node 140 maintains multicast information indicating child nodes registered for respective multicasts. A child node of router node 140 registers with router node 140 for a particular multicast address if the child node is a destination node (end recipient) for the multicast address, or has one or more nodes in the downward direction (i.e., direction towards a leaf node) that has/have registered for the multicast address. Control then passes to step 220.

In step 220, router node 140 receives a layer-3 multicast packet identified by a layer-3 multicast address in the destination IP address field. The source/originator of the layer-3 multicast packet may either be another node within mesh 195 or a device in internet 190. Control then passes to step 250.

In step 250, router node 140 unicasts, at L2-level, the multicast packet to child nodes indicated by the multicast table as having registered for the multicast address of the multicast packet. As is well known, L2 (layer-2) level implies that the corresponding operation concerns sharing of the medium (medium access control) and the addressing structure corresponds to L2 level (contrasted with Internet Protocol, which may be viewed as operating at layer-3/higher level).

Thus, for example, assuming each of router nodes 150 and 160 has registered for the multicast address, router node 140 (separately) unicasts the multicast packet to each of router nodes 150 and 160. Control then passes to step 220, and the corresponding steps of the flowchart of FIG. 2 may be repeated.

It may thus be appreciated from the description above, that each of the router nodes (including border router 110) may merely need to maintain information indicating which of the child nodes is registered for a corresponding multicast. Accordingly, memory requirements in each router node are reduced.

However, each multicast packet is unicast only to the child nodes registered to receive the multicast packet, and therefore the multicast packets may be efficiently delivered without using layer-2 broadcast feature (thereby avoiding overhead for child nodes not required to receive the specific multicast packets).

In a first embodiment, multicast packets originating at any of the end devices are first forwarded as unicast packets to border router 110, merely based on parent information at each node in the path. Border router 110 may then operate in accordance with FIG. 2 to unicast packets to only those of devices (140, 170, 111 and 112) registered to receive the multicast packet. In case of router node 140, the packet of step 220 is accordingly deemed to be received from border router 110.

In a second embodiment, when a multicast packet originates at an end device (e.g., 151, lower in the hierachy) and is received by router node 140 from router node 150, router node 140 may unicast the packet in accordance with step 250 to all child nodes (other than the one from which the multicast packet is received) that are registered for the corresponding multicast address, in addition to forwarding to the parent node.

The description is continued assuming the 'first embodiment' noted above, though implementation of the 'second embodiment' will also be apparent to one skilled in the relevant arts by reading the disclosure provided herein. In particular, the manner in which a neighbor table is created and maintained in a node (router node or end device) of a wireless network is described next with respect to an embodiment.

4. Formation of Mesh and Creation of Neighbor Tables

As noted above, in an embodiment, mesh 195 is formed according to the RPL protocol. The RPL protocol specifies a set of ICMPv6 (Internet Control Message Protocol version 6) control messages such as DIS (DODAG Information Solicitation), DIO (DODAG Information Object) and DAO (DODAG Destination Advertisement Object) for formation of a mesh network. The format of each of the messages is described in detail in RFC 6550. The term DODAG stands for Destination Oriented Directed Acyclic Graph, and represents the network topology of a wireless mesh network such as mesh 195.

Based on designated roles (router, end device or root as configured by a user/operator) for each device/node, RPL operates to define a tree structure of the wireless devices, with a border router at the root level, and end devices at the leaf level. The tree-building process starts at border router 110, with border router 110 broadcasting a DIO message. The DIO message includes the 128-bit IPv6 (Internet Protocol version 6) address of border router 110. Wireless devices (such as router 140 and end devices 111 and 112) within wireless communication range of border router 110 receive the DIO message, and add border router 110 as a neighbor in a corresponding locally maintained neighbor table, also storing in the neighbor table the MAC and IP address of the neighbor. In addition, based on the network prefix (specified in the DIO message) indicated by border router 110 in the broadcast DIO message, each of the nodes ("range nodes") in the transmission range of border router 110 assigns itself an IP address. The respective IP addresses may be the concatenation of the network prefix and the MAC address of the corresponding node.

As a response to the DIO message received from border router 110, each of the range nodes 140, 111 and 112 transmits (separately) a corresponding (unicast) DAO message to border router 110, specifying that it has selected border router 110 as its parent. In response to receipt of the DAO messages from its neighbors, border router 110 locally stores information specifying that devices 140, 111 and 112 are its child nodes, as well as their IP addresses.

Each of the other router nodes (i.e., other than border router 110) also broadcasts (layer-3 and layer-2 broadcasts) corresponding DIO messages (based, for example, on timeout of a trickle timer) to advertise its presence to other nodes (not yet part of the wireless mesh network), thereby enabling such nodes to potentially join the mesh network. Thus, router node 140 broadcasts another DIO message that may be processed similarly as noted above by the range nodes of router nodes 140, namely router nodes 150 and 160. Leaf nodes (end devices of FIG. 1) do not transmit DIO frames, but, at the time of joining mesh 195, merely respond to a received DIO frame by transmitting a corresponding DAO frame destined to border router 110 via any intervening router nodes (as noted below). The contents of such a DAO frame specify the 'parent' router node selected by the leaf node.

A node (router node or leaf node/end device) that receives a DIO message, transmits a corresponding DAO frame to border router 110. The destination address in the IP header of such DAO frame is the IP address of border router 110, and the destination address in the MAC header is the MAC address of the router node from which the DIO frame was received. The corresponding router node forwards the DAO message to the next-hop router node (if present) or to border router 110. Thus, border router 110 eventually obtains and stores the addresses of each of the other nodes, as well as the network paths available to reach such nodes in its routing table. The contents of the DAO message specify which node has been selected as a parent node by the node that originates the DAO frame.

To illustrate, when router node 150 wishes to join mesh 195, router node 150 may respond to receipt of a DIO frame broadcast by router node 140 by transmitting a corresponding DAO frame with IP destination address that of border router 110 and MAC destination address that of router node 140. The contents of the DAO frame (such as a parent list) would specify that router node 150 has selected router node 140 as its parent. On receipt of the DAO frame, router node 140 updates its neighbor table (table 300 of FIG. 3, described below) to include router node 150 as its child while also storing the IP and MAC addresses of router node 150. Router node 140 would also forward the DAO frame to border router 110.

Thus, each of router nodes (140, 150, 160 and 170) and end devices (111, 112, 151, 152, 161, 162, 171 and 172) create and maintain 'neighbor tables' containing a list of the neighbor nodes and whether the neighbor is a parent or child, and their MAC (Medium Access Control) and IP addresses. Specifically, none of router nodes 140, 150, 160 and 170 creates or maintains (other) routing information/routing tables for unicast packets, since mesh 195 is to operate in non-storing mode with respect to forwarding of unicast packets. Non-storing mode of operation of mesh 195 may be required to minimize storage/memory requirements in the router nodes, and/or reduced power consumption in the routers.

FIG. 3 is a diagram of a neighbor table 300 that may be created and maintained in router node 140. Column 1 of table 300 lists the neighbors, column 2 the MAC address of the neighbors, column 3 the IP address of the neighbors, and column 4 indicates whether the neighbor is a parent node or a child node of router node 140. Thus, row 2 of table 300 indicates that router node 150 is a neighbor, that MAC-150 and IP-150 are respectively the MAC and IP addresses of router node 150, and that router node 150 is a child node of router node 140. Each of the other router nodes as well as the end devices of FIG. 1 creates and maintains similar neighbor tables. For example, the neighbor table of end device 151 would indicate only one neighbor, i.e., router node 150, and would the MAC and IP addresses of router node 150. As another example, the neighbor table of router node 160 would contain three neighbors, namely router node 140, end device 161 and end device 162, and the respective MAC and IP addresses.

In the formation of mesh 195 described above, instead of waiting to receive a DIO message as noted above, nodes in mesh 195 may also proactively solicit information (in the form of corresponding DIO messages) from the neighbor nodes using DIS messages, as specified in RFC 6550. Further, a node may receive DIO messages from multiple other router/root nodes, and make a decision based on certain rules (according to parameters such as objective function, DAG characteristics, advertised path cost, etc., as specified by the RPL protocol) as to which router/root node to designate as its parent.

The description is continued with an illustration of the manner in which a multicast table is created/updated in a node of mesh 195, in an embodiment.

5. Registering for a Multicast Address

According to an aspect of the present disclosure, an end device that wishes to be a recipient/destination for a multicast address registers with border router 110. The end device, therefore, transmits a registration request in the form of a corresponding DAO message to border router 110 via all the intervening router nodes. To clarify with an example embodiment, assume that end devices 151, 152 and 161 wish to register for a multicast address M1.

End device 161 transmits a corresponding registration request in the form of a DAO message (which also contains the address M1 in the body of the message) with destination IP address as that of border router 110, and destination MAC address as that of its parent, i.e., router node 160.

Router node 160 receives the registration request. Router node 160 adds the multicast address M1 in a locally maintained multicast table, and an indicator (for example a logic 1 bit) indicating that neighbor end device 161 has registered for the multicast address M1. Router node 160 then forwards the registration request with the MAC address of its parent router node 140 as the destination MAC address, while retaining the IP address of border router 110 in the destination IP address field.

Router node 140 receives the forwarded registration request. Router node 140 adds the multicast address M1 in a locally maintained multicast table, and an indicator (for example a logic 1 bit) indicating that neighbor router node 160 has a node in the downward path (i.e., in the direction of leaf node 161) that has requested registration for the multicast address M1. Router node 140 then forwards the registration request with the MAC address of its parent border router 110 as the destination MAC address, while retaining the IP address of border router 110 in the destination IP address field.

Border router 110 receives the forwarded registration request. Border router 110 adds the multicast address M1 in a locally maintained multicast table, and an indicator (for example a logic 1 bit) indicating that neighbor router node 140 has a node in the downward path (i.e., in the direction of leaf node 161) that has requested registration for the multicast address M1.

Each of end devices 151 and 152 similarly transmits respective registration requests to border router 110 via router node 150 and router node 140. Each of nodes 150, 140 and 110 update their multicast tables with corresponding entries. End devices belonging to other multicast addresses (e.g., M2) similarly send registration requests to border router 110, with the intervening router nodes in the path between the corresponding end device and border router 110 updating their multicast tables accordingly.

In another embodiment, an end device transmits the registration request directly to its parent, i.e., the destination IP address (as well as the destination MAC address) is that of the parent, rather than border router 110. The parent node updates its multicast table and forwards the request directly to its parent, and so on till a request reaches border router 110.

Figure 4:
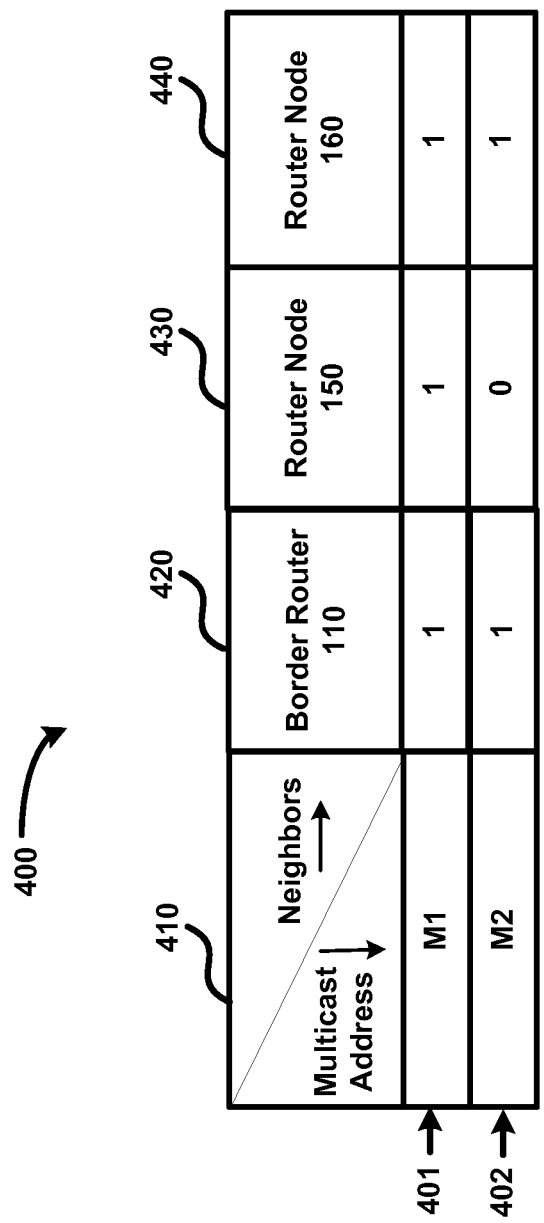
FIG. 4 is a diagram showing the contents of a multicast table maintained in a node of a wireless network, in an embodiment of the present disclosure.

FIG. 4 is a diagram of an example multicast table 400 maintained in router node 140. Neighbor nodes of router node 140 are listed in the X-dimension (or X-direction), while multicast addresses are listed in the Y-dimension (or Y-direction). The entry (a binary 1 or a binary 0) at the intersection of the corresponding X and Y dimensions specifies whether the corresponding child node is registered for the corresponding multicast address or not. Column 410 lists example multicast addresses M1 and M2. Column 430 lists the registration entries (1 or 0) for child router node 150 for each multicast address M1 and M2. Column 440 lists the registration entries (1 or 0) for child router node 160 for each multicast address M1 and M2. A registration entry of 1(0) indicates that the corresponding neighbor has (has not) registered for the corresponding multicast address. Column 420 lists the entries corresponding to border router 110 for each multicast address M1 and M2. It is noted that each of the entries for border router 110 is a binary 1 since by default a multicast frame is forwarded to border router 110 (being a parent of router node 140) if the multicast frame is received from a child of router node 140.

The binary entries of table 400 of FIG. 4 may be maintained in the following manner. Since router node 140 has three neighbors, a set of three binary entries, one for each of the three neighbors, is maintained corresponding to each multicast address. Thus, a set of binary entries 1, 1 and 1 is maintained for multicast address M1 in row 401. The first bit of the set of three entries corresponds to border router 110 (which is the first neighbor in neighbor table 300 of FIG. 3). The second bit of the set of three entries corresponds to router node 150 (which is the second neighbor in neighbor table 300 of FIG. 3). The third bit of the set of three entries corresponds to router node 160 (which is the third neighbor in neighbor table 300 of FIG. 3). A set of binary entries 1, 0 and 1 is similarly maintained for multicast address M2 in row 402.

As noted above, multicast address M1 has end devices 151, 152 and 161 as the destination devices. Therefore each of router node 150 and router node 160 has an entry of 1 for multicast address M1, as indicated by row 401. Thus, when router node 140 receives a multicast packet with multicast destination address M1, router node 140 would (separately) unicast the multicast packet to each of router node 150 and router node 160.

It is assumed that multicast address M2 has end devices 161 and 171 as the destination devices, and each of end devices 161 and 171 register with border router 110 for multicast address M2 in the manner similar to that described above. Therefore, only router node 160 has an entry of 1 for M3, with router node 150 having an entry of 0, as indicated by row 402. Thus, when router node 140 receives a multicast packet with multicast destination address M2, router node 140 would unicast the multicast packet only to router node 160.

Once multicast tables are created for the corresponding router nodes of mesh 195 in the manner similar to that described above, multicast data may be delivered to destination nodes in mesh 195, as illustrated next with an example.

Assuming that end device 171 wishes to transmit a multicast packet with multicast address M1, end device 171 generates the multicast packet (referred to for convenience as 'M1 packet' below), and unicasts (at L2 level) the M1 packet to parent router node 170. Since the M1 packet is not from the parent of router node 170, router node 170 unicasts (at L2 level) the M1 packet to its parent border router 110. Router node 170 also inspects its multicast table (not shown) and finds that there are no entries for address M1.

Border router 110 inspects its multicast tables and finds that router node 140 has an entry of 1 for address M1. Hence, border router 110 unicasts the M1 packet to router node 140 (step 250).

Router node 140 receives the M1 packet, inspects table 400 (FIG. 4), and finds that each of router nodes 150 and 160 has an entry of 1 for address M1 (row 401 of table 400). Hence, router node 140 (separately) unicasts the M1 packet to each of router nodes 150 and 160.

Router node 150 receives the M1 packet, inspects its multicast table (not shown), and finds that each of end devices 151 and 152 has an entry of 1 for address M1. Hence, router node 150 (separately) unicasts the M1 packet to each of end devices 151 and 152.

Router node 160 receives the M1 packet, inspects its multicast table (not shown), and finds that end device 161 has an entry of 1 for address M1. Hence, router node 150 unicasts the M1 packet to end device 161. Thus, the M1 packet is delivered to destination devices 151, 152 and 161.

The implementation details of a router node (110, 140, 150, etc.) in an embodiment of the present disclosure are provided next.

6. Example Implementation

Figure 5:
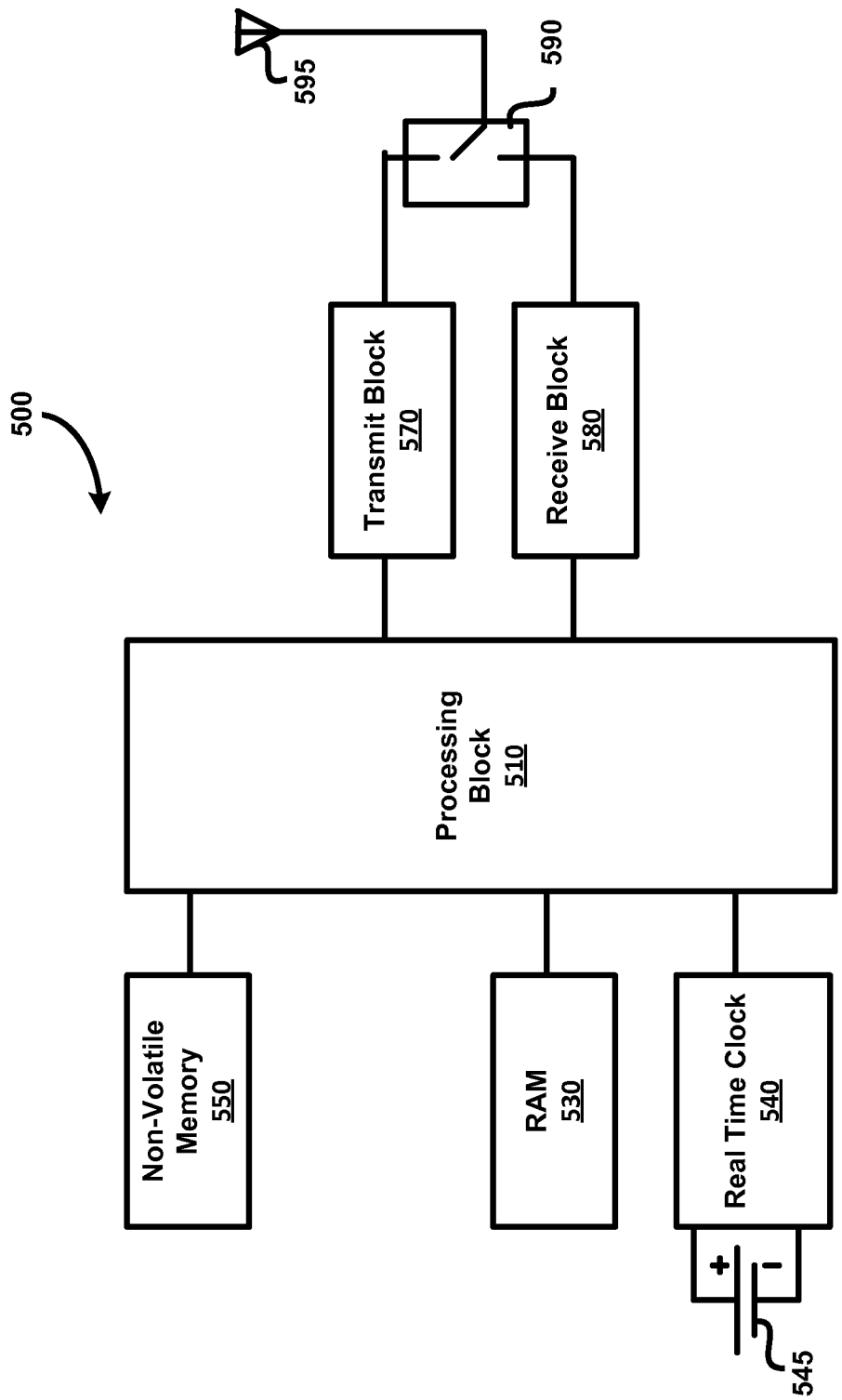
FIG. 5 is a block diagram illustrating the implementation details of a wireless station in an embodiment of the present disclosure.

FIG. 5 is a block diagram showing the implementation details of a router in an embodiment of the present disclosure. Router 500 can correspond to any of the router nodes (110, 150, etc.) of FIG. 1, and is shown containing processing block 510, random access memory (RAM) 530, real-time clock (RTC) 540, battery 545, non-volatile memory 550, transmit block 570, receive block 580, switch 590, and antenna 595. The whole of router node 500 may be implemented as a system-on-chip (SoC), except for battery 545 and antenna 595. Alternatively, the blocks of FIG. 5 may be implemented on separate integrated circuits (IC).

Battery 545 provides power for operation of router node 500, and may be connected to the various blocks shown in FIG. 5 (although shown connected only to RTC 540). RTC 540 operates as a clock, and provides the 'current' time to processing block 510.

Antenna 595 operates to receive from, and transmit to, a wireless medium, corresponding wireless signals (e.g., according to IEEE 802.11 (WLAN) standards). Switch 590 may be controlled by processing block 510 (connection not shown) to connect antenna 595 to one of blocks 570 and 580 as desired, depending on whether transmission or reception of wireless signals is required. Switch 590, antenna 595 and the corresponding connections of FIG. 5 are shown merely by way of illustration. Instead of a single antenna 595, separate antennas, one for transmission and another for reception of wireless signals, can also be used. Various other techniques, well known in the relevant arts, can also be used instead.

Transmit block 570 receives, from processing block 510, data to be transmitted on a wireless signal (e.g., according to a wireless standard such as IEEE 802.11), generates a modulated radio frequency (RF) signal according to the standard, and transmits the RF signal via switch 590 and antenna 595. Transmit block 470 may contain RF and baseband circuitry for generating and transmitting WLAN signals, as well as for medium access operations. Alternatively, transmit block 570 may contain only the RF circuitry, with processing block 510 performing the baseband and medium access operations (in conjunction with the RF circuitry).

Receive block 580 represents a receiver that receives a wireless (RF) signal (e.g., according to IEEE 802.11) bearing data and/or control information via switch 590, and antenna 595, demodulates the RF signal, and provides the extracted data or control information to processing block 510. Receive block 580 may contain RF as well as baseband processing circuitry for processing a WLAN signal. Alternatively, receive block 580 may contain only the RF circuitry, with processing block 510 performing the baseband operations in conjunction with the RF circuitry.

When router 500 is implemented according to IEEE 802.15.4 standards, transmit block 570, receive block 580, antenna 595 and the corresponding signals would be according IEEE 802.15.4.

Non-volatile memory 550 is a non-transitory machine readable medium, and stores instructions, which when executed by processing block 510, causes router node 500 to operate as described above. In particular, the instructions enable router node 500 to operate as described with respect to the flowchart of FIG. 2.

RAM 530 is a volatile random access memory, and may be used for storing instructions and data. In addition, RAM 530 may be used to store the neighbor table and multicast table described above.

RAM 530 and non-volatile memory 550 (which may be implemented in the form of read-only memory/ROM/Flash) constitute computer program products or machine (or computer) readable medium, which are means for providing instructions to processing block 510. Processing block 510 may retrieve the instructions, and execute the instructions to provide several features of the present disclosure.

Processing block 510 (or processor in general) may contain multiple processing units internally, with each processing unit potentially being designed for a specific task. Alternatively, processing block 510 may contain only a single general-purpose processing unit. Processing block 510 may execute instructions stored in non-volatile memory 550 or RAM 530 to enable router node 500 to operate according to several aspects of the present disclosure, described above in detail.

Additional examples illustrating the manner in which multicasts packets are delivered are provided next with respect to the 'first embodiment' and the 'second embodiment' noted above. It is assumed in each of the two examples below that end device 162 is to transmit a multicast packet with the multicast address M1 ('M1 packet', for which the destination nodes are end devices 151, 152 and 161, as also noted above).

In the 'first embodiment', end device 162 generates the M1 packet, and then unicasts the M1 packet to parent router node 160. Router node 160 in turn forwards (by unicasting)

the received M1 packet to its parent router node 140. Router node 140 in turn forwards (by unicasting) the received M1 packet to its parent border router 110. Border router 110 thereafter unicasts the M1 packet to router node 140 (since router node 140 would have registered with border router 110 for the M1 address). Router node 140 then unicasts the M1 packet (received from border router 110) to each of router nodes 150 and 160. Router node 150 then unicasts the M1 packet to each of end devices 151 and 152, and router node 160 unicasts the M1 packet (after receipt from router node 140) to end device 161.

In the 'second embodiment', end device 162 generates the M1 packet, and then unicasts the M1 packet to parent router node 160. In response, router node 160 unicasts the received M1 packet to end device 161, and also forwards (by unicasting) the M1 packet to parent router node 140. Router node 140 in turn unicasts the M1 packet to router node 150 (but not to router node 160 since router node 140 received the M1 packet from router node 160), and also forwards (by unicasting) the M1 packet to its parent, i.e., border router 110. Router node 150 in turn unicasts the M1 packet to each of end devices 151 and 152, without forwarding the M1 packet to its parent router node 140. Border router 110 does not further transmit the M1 packet to any node, and may merely discard the M1 packet.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of forwarding packets in a router node of a wireless network, said method comprising:

participating in a routing protocol to form a hierarchy of nodes constituting said wireless network, wherein said hierarchy comprises a root node and a set of end devices as leaf nodes, wherein each child node is determined based on said hierarchy, wherein said routing protocol is RPL (IPv6 Routing Protocol for Low-Power and Lossy Networks), and said root node is a border router of said wireless network, wherein said router node is between an end device and said border router, wherein said border router maintains routing information for said wireless network;

receiving a layer-3 unicast packet from said end device, said unicast packet containing a destination IP address of another node;

forwarding said layer-3 unicast packet towards said border router as part of said non-storing mode such that said border router can thereafter use said routing information to deliver said layer-3 unicast packet to a destination node corresponding to said destination IP address, wherein said layer-3 unicast packet is a Destination Oriented Directed Acyclic Graph Destination Advertisement Object (DAO) message of said RPL, wherein contents of said DAO message specify that said end device has selected said router node as a parent node, wherein said router node creates information specifying that said end device is a child node of said router node;

maintaining multicast information indicating child nodes registered for respective multicasts, while operating in a non-storing mode along with other router nodes of said wireless network for processing unicast packets, wherein said multicast information is maintained in the form of a multicast table, said multicast table representing in one dimension a plurality of child nodes, which are child nodes of said router node according to said hierarchy, said multicast table representing in another dimension a set of multicast addresses representing the respective multicasts served by said router node, wherein each entry at an intersection of said one dimension and said another dimension indicates whether the corresponding child node is registered for the corresponding multicast;

receiving a registration request from a first child node in the form of an IP (Internet Protocol) packet encapsulated in layer-2 header, said registration request specifying an end device for registration to receive multicast packets of a first multicast, wherein said layer-2 header specifies said router node as a destination and an IP header of said IP packet specifies said border router as a destination;

updating said multicast table to indicate that said first child node is registered to receive packets of said first multicast;

forwarding said registration request to a parent of said router node;

receiving a layer-3 multicast packet containing a layer-3 multicast address identifying a corresponding multicast;

examining said multicast information in said multicast table to identify a set of child nodes registered for said multicast; and unicasting, at L2-level, said layer-3 multicast packet to each child node of said set of child nodes.

2. The method of claim 1, wherein said layer-3 multicast packet is generated at a first end device which is below said router node in said hierarchy, wherein said layer-3 multicast packet is received first from a child node of said router node, said method further comprising:

forwarding said layer-3 multicast packet to a parent of said router such that said layer-3 multicast packet eventually reaches said root node, wherein said layer-3 multicast packet is received from said parent before said routing node performs said examining and said unicasting.

3. The method of claim 1, wherein said layer-3 multicast packet is generated at a second end device which is below said router node in said hierarchy, wherein said layer-3 multicast packet is received from a second child node of said router node, wherein said unicasting is performed in response to receiving of said layer-3 multicast packet from said second child, said method further comprising:

forwarding said layer-3 multicast packet to a parent of said router node also in response to receiving of said layer-3 multicast packet.

4. A non-transitory machine readable medium storing one or more sequences of instructions for enabling a router node of a wireless network to forward packets, wherein execution of said one or more instructions by one or more processors contained in said router node enables said router node to perform the actions of:

participating in a routing protocol to form a hierarchy of nodes constituting said wireless network, wherein said hierarchy comprises a root node and a set of end devices as leaf nodes, wherein each child node is determined based on said hierarchy, wherein said routing protocol is RPL (IPv6 Routing Protocol for Low-Power and Lossy Networks), and said root node is a border router of said wireless network, wherein said router node is between an end device and said border router, wherein said border router maintains routing information for said wireless network;

receiving a layer-3 unicast packet from said end device, said unicast packet containing a destination IP address of another node;

forwarding said layer-3 unicast packet towards said border router as part of said non-storing mode such that said border router can thereafter use said routing information to deliver said layer-3 unicast packet to a destination node corresponding to said destination IP address, wherein said layer-3 unicast packet is a Destination Oriented Directed Acyclic Graph Destination Advertisement Object (DAO) message of said RPL, wherein contents of said DAO message specify that said end device has selected said router node as a parent node, wherein said router node creates information specifying that said end device is a child node of said router node;

maintaining multicast information indicating child nodes registered for respective multicasts, while operating in a non-storing mode along with other router nodes of said wireless network for processing unicast packets, wherein said multicast information is maintained in the form of a multicast table, said multicast table representing in one dimension a plurality of child nodes, which are child nodes of said router node according to said hierarchy, said multicast table representing in another dimension a set of multicast addresses representing the respective multicasts served by said router node, wherein each entry at an intersection of said one dimension and said another dimension indicates whether the corresponding child node is registered for the corresponding multicast;

receiving a registration request from a first child node in the form of an IP (Internet Protocol) packet encapsulated in layer-2 header, said registration request specifying an end device for registration to receive multicast packets of a first multicast, wherein said layer-2 header specifies said router node as a destination and an IP header of said IP packet specifies said border router as a destination;

updating said multicast table to indicate that said first child node is registered to receive packets of said first multicast;

forwarding said registration request to a parent of said router node;

receiving a layer-3 multicast packet containing a layer-3 multicast address identifying a corresponding multicast;

examining said multicast information in said multicast table to identify a set of child nodes registered for said multicast; and unicasting, at L2-level, said layer-3 multicast packet to each child node of said set of child nodes.

5. The non-transitory machine readable medium of claim 4, wherein said layer-3 multicast packet is generated at a first end device which is below said router node in said hierarchy, wherein said layer-3 multicast packet is received first from a child node of said router node, said non-transitory machine readable medium further comprising instructions for:

forwarding said layer-3 multicast packet to a parent of said router such that said layer-3 multicast packet eventually reaches said root node, wherein said layer-3 multicast packet is received from said parent before said routing node performs said examining and said unicasting.

6. The non-transitory machine readable medium of claim 4, wherein said layer-3 multicast packet is generated at a second end device which is below said router node in said hierarchy, wherein said layer-3 multicast packet is received from a second child node of said router node, wherein said unicasting is performed in response to receiving of said layer-3 multicast packet from said second child, said non-transitory machine readable medium further comprising instructions for:

forwarding said layer-3 multicast packet to a parent of said router node also in response to receiving of said layer-3 multicast packet.

7. A router node of a wireless network, said router node comprising:

a processing block and a memory, said memory to store instructions which when retrieved and executed by said processing block causes said router node to perform the actions of:

participating in a routing protocol to form a hierarchy of nodes constituting said wireless network, wherein said hierarchy comprises a root node and a set of end devices as leaf nodes, wherein each child node is determined based on said hierarchy, wherein said routing protocol is RPL (IPv6 Routing Protocol for Low-Power and Lossy Networks), and said root node is a border router of said wireless network, wherein said router node is between an end device and said border router, wherein said border router maintains routing information for said wireless network;

receiving a layer-3 unicast packet from said end device, said unicast packet containing a destination IP address of another node;

forwarding said layer-3 unicast packet towards said border router as part of said non-storing mode such that said border router can thereafter use said routing information to deliver said layer-3 unicast packet to a destination node corresponding to said destination IP address, wherein said layer-3 unicast packet is a Destination Oriented Directed Acyclic Graph Destination Advertisement Object (DAO) message of said RPL, wherein contents of said DAO message specify that said end device has selected said router node as a parent node, wherein said router node creates information specifying that said end device is a child node of said router node;

maintaining multicast information indicating child nodes registered for respective multicasts, while operating in a non-storing mode along with other router nodes of said wireless network for processing unicast packets, wherein said multicast information is maintained in the form of a multicast table, said multicast table representing in one dimension a plurality of child nodes, which are child nodes of said router node according to said hierarchy, said multicast table representing in another dimension a set of multicast addresses representing the respective multicasts served by said router node, wherein each entry at an intersection of said one dimension and said another dimension indicates whether the corresponding child node is registered for the corresponding multicast;

receiving a registration request from a first child node in the form of an IP (Internet Protocol) packet encapsulated in layer-2 header, said registration request specifying an end device for registration to receive multicast packets of a first multicast, wherein said layer-2 header specifies said router node as a destination and an IP header of said IP packet specifies said border router as a destination;

updating said multicast table to indicate that said first child node is registered to receive packets of said first multicast;

forwarding said registration request to a parent of said router node;

receiving a layer-3 multicast packet containing a layer-3 multicast address identifying a corresponding multicast;

examining said multicast information in said multicast table to identify a set of child nodes registered for said multicast; and unicasting, at L2-level, said layer-3 multicast packet to each child node of said set of child nodes.

8. The router node of claim 7, wherein said layer-3 multicast packet is generated at a first end device which is below said router node in said hierarchy, wherein said layer-3 multicast packet is received first from a child node of said router node, wherein said processing block further performs the action of:

forwarding said layer-3 multicast packet to a parent of said router such that said layer-3 multicast packet eventually reaches said root node, wherein said layer-3 multicast packet is received from said parent before said routing node performs said examining and said unicasting.

9. The router node of claim 7, wherein said layer-3 multicast packet is generated at a second end device which is below said router node in said hierarchy, wherein said layer-3 multicast packet is received from a second child node of said router node, wherein said unicasting is performed in response to receiving of said layer-3 multicast packet from said second child, said method further comprising:

forwarding said layer-3 multicast packet to a parent of said router node also in response to receiving of said layer-3 multicast packet.

* * * * *